(12) United States Patent
Egner-Walter et al.

(10) Patent No.: US 6,742,218 B1
(45) Date of Patent: Jun. 1, 2004

(54) WIPER BLADE FOR CLEANING A WINDSCREEN, IN PARTICULAR, A CURVED WINDSCREEN OF A VEHICLE

(75) Inventors: Bruno Egner-Walter, Heilbronn (DE); Wilhelm Dorr, Bietighelm-Bissingen (DE)

(73) Assignee: Valeo Auto-Electric Wischer und Motoren GmbH (DE)

( * ) Notice: Subject to any disclaimer, the term of this patent is extended or adjusted under 35 U.S.C. 154(b) by 113 days.

(21) Appl. No.: 10/070,066
(22) PCT Filed: Aug. 5, 2000
(86) PCT No.: PCT/EP00/07620
§ 371 (c)(1), (2), (4) Date: Feb. 26, 2002
(87) PCT Pub. No.: WO01/14182
PCT Pub. Date: Mar. 1, 2001

(30) Foreign Application Priority Data

Aug. 26, 1999 (DE) .......................... 199 40 492

(51) Int. Cl.⁷ .................................................. B60S 1/38
(52) U.S. Cl. .................................. 15/250.44; 15/250.43
(58) Field of Search ....................... 15/250.44, 250.451, 15/250.452, 250.453, 250.454, 250.46, 250.48, 250.361, 250.43

(56) References Cited

FOREIGN PATENT DOCUMENTS

| DE | 11 97 338 | 7/1965 | | |
|---|---|---|---|---|
| DE | 38 23 001 | 1/1990 | | |
| EP | 0343869 | * 11/1989 | .............. | 15/250.44 |
| EP | 0 477 804 | 4/1992 | | |
| GB | 2064308 | * 6/1981 | .............. | 15/250.44 |

* cited by examiner

Primary Examiner—Gary K. Graham
(74) Attorney, Agent, or Firm—J. Gordon Lewis

(57) ABSTRACT

A wiper blade for cleaning a windscreen, in particular, a curved windscreen on a vehicle, has a frame with at least two claws to retain and guide a rubber-like wiper element, where the frame has at least one claw bow with a claw on at least one end of the bow and a pivot at a distance from the claw, where the claw has a contact surface at the claw base pressing on the upper side of the wiper element, where the surface is delimited in the longitudinal direction of the bow by an outer edge and an inner edge and has a maximum length and has claw fingers on the opposite longitudinal sides of the wiper element which capture the rear body forming part of the wiper element or engage longitudinal grooves in the side of the rear body and are delimited in the longitudinal direction by an outer edge and an inner edge, and the contact surface envisages that the claw fingers of at least one claw of the wiper blade are offset in relation to the contact surface in the longitudinal direction of the bow toward the pivot of the claw bow in such a way that the outer edges of the claw fingers are located within an area which extends from inclusive of half the maximum length of the contact surface as far and into the distance between the inner edge of the contact surface and the pivot of the claw bow.

11 Claims, 4 Drawing Sheets

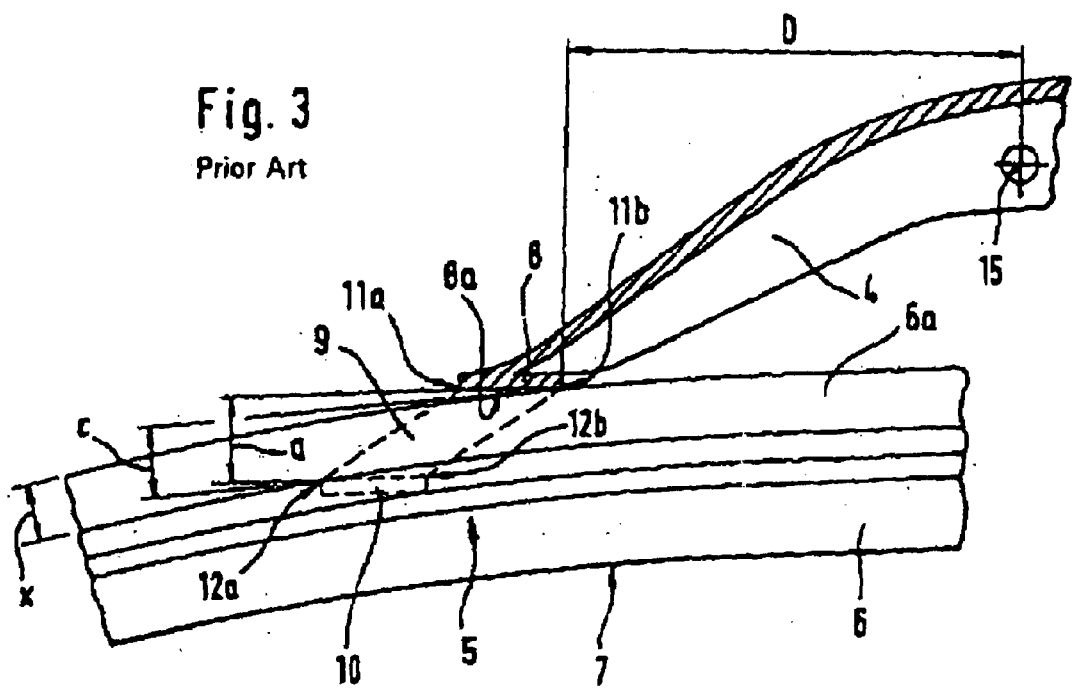

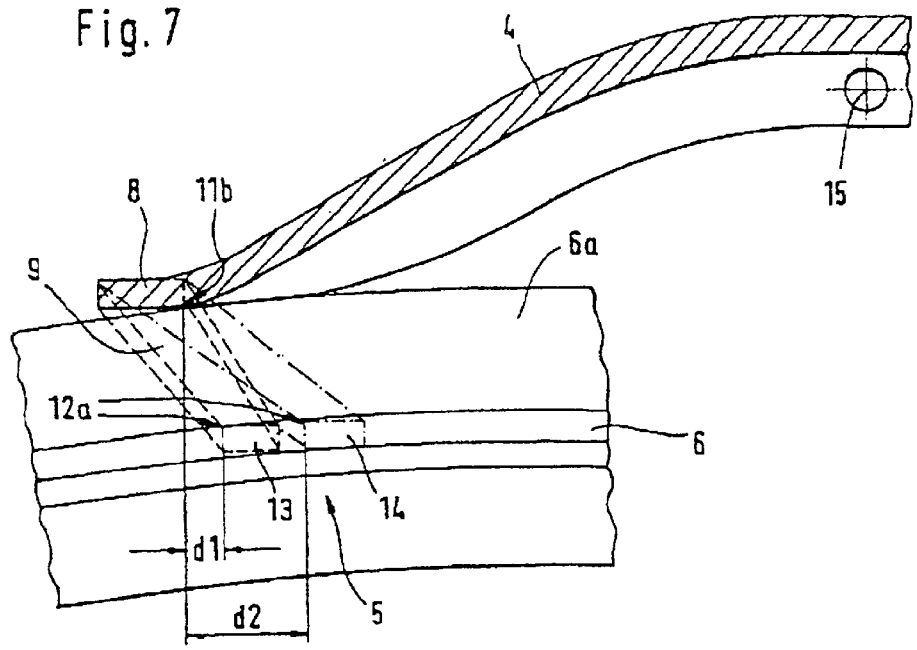
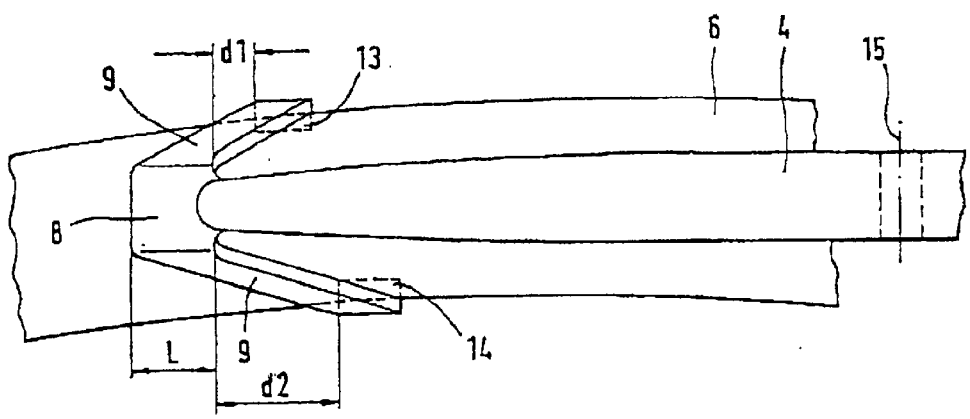

WIPER BLADE FOR CLEANING A WINDSCREEN, IN PARTICULAR, A CURVED WINDSCREEN OF A VEHICLE

BACKGROUND

The invention relates to a wiper blade for cleaning a windshield, in particular, a curved windshield of a vehicle.

A wiper blade with a claw of this type has been known for a long time, from U.S. Pat. No. 1,197,338, for example, and finds an application in almost every windshield wiper installation used today for cleaning a windshield on a vehicle. The wiper element of a wiper blade of this type is positioned in the claws with at least limited axial freedom so that the flexible wiper element is largely able to conform to the surface shape of the windshield to be wiped. The claws located on a claw bow serve to guide the wiper element along the windshield to be wiped and to transmit the requisite contact pressure to the wiper element, where the glass can also have a contoured shape. When designing claws, one consideration is that they guide the wiper element, or its rear body, as closely and precisely as possible. Nevertheless, the wiper element must have enough play in the claw to allow the wiper element some axial freedom in the claw.

Known wiper blades of this type however are under the disadvantage that they are poorly suited for use on at least partially contoured windshields.

The conflicting goal of ensuring close and precise guidance of the wiper element in the claw on the one hand and of permitting sufficient play in the claw for axial freedom of the wiper element on the other hand when wiping a contoured windshield cannot be met with known wiper blades. When claws for known windshield wipers are used for glass that is steeply contoured, particularly at the edges of the glass, the wiper element either jams because of its curvature or it floats because of excessive play in the claw so that optimal guiding of the wiper element is not ensured. The consequence is unsatisfactory wiping.

The object of the present invention is therefore to create a wiper blade with claws to locate a rubber-like wiper element at least partially, where the claws ensure good guidance and good axial freedom of the rubber-like wiper element in the claws even with a contoured or partially contoured windshield.

SUMMARY

To accomplish this object a wiper blade of the type described above is proposed in which the claw fingers of at least one claw on the wiper blade are offset toward the pivot of the bow in the longitudinal direction of the frame in relation to the contact surface in the claw base in such a way that the outer edges of the claw fingers are located within an area which extends from inclusive of the half of the maximum length of the contact surface as far as the distance between the inner edge of the contact surface and the pivot of the bow. In the sense of the invention, an outer edge of the contact surface in the claw base or an outer edge of a claw foot is always that edge which faces outward in the longitudinal direction of the frame. Correspondingly, an inner edge of the contact surface in the claw base or an inner edge of a claw finger is always that edge which faces inward in the longitudinal direction of the bow.

Alternatively this can be expressed in this way, that in the case of at least one claw on the windshield wiper, the claw fingers projected onto the windshield in relation to the contact surface projected onto the windshield are offset in such a way toward the pivot of the claw bow that the claw fingers projected onto the windshield are not overlapped by the bearing surface projected onto the windshield in the longitudinal direction of the claw bow, or at most by the half of the contact surface facing the pivot projected onto the windshield.

The claw designed under the invention can be used in a wide variety of frame or bow designs. So a claw bow configured according to the invention can, for example, be a primary bow pivotable directly at the wiper arm with a claw at each end, or a claw bow pivoted at a higher order bow with a claw at one end, or a bow with a claw at only one end and a claw bow at its other end. Similarly the frame for a windshield wiper can have two bows which are connected to each other at one of their ends by means of an articulated link and at least one of these bows has at its other end a claw configured in accordance with the invention. The invention is intended further to include wiper blades with such frame or bow designs in which the claw or claws respectively are not located on the underside of the bow, but are located or configured, for example, laterally on or laterally from the bow.

Furthermore it should be made clear that wiper blades in accordance with the invention can be used for all possible types of glass, such as windshields, rear windows, side windows, (viewing windows in general), headlamp glass, rear lamp glass, backup lights and similar lights on different vehicles, specifically motor vehicles.

The wiper blade in accordance with the invention has the advantage that even with more steeply contoured windshields better conformance and guidance of the rubber-like wiper element to the glass to be wiped is ensured compared with known wiper blades. Jamming of the wiper element in the claw, as is regularly the case under the prior art in the case of steeply contoured glass, cannot happen under the invention.

Optimal design of the wiper blade is achieved from a further development of the invention, according to which a clearance d, with d equal to or greater than zero, is present between the inner edge of the contact surface provided on the claw base and the outer edges of the claw fingers.

The relevant cross section for the wiper element is calculated from the width b of the claw and the relevant opening dimension c of the claw for the part of the wiper element received by the claw. The opening dimension c is determined as the hypotenuse of the triangle with the legs as clearance d and claw depth a. From this it follows that when d is greater than or equal to zero, the opening dimension c is greater than or equal to claw depth a. Consequently, it is ensured that the relevant cross section of the claw for the part of the wiper element received by the claw is always greater than or equal to claw height a under the invention, particularly in the case of contoured glass. As a result of the necessary latitude of the wiper element in the claw, axial freedom of the wiper element is always possible and jamming of the wiper element does not occur, whereby correspondingly good results are achieved when wiping the glass.

In accordance with an advantageous embodiment of the invention, the two claw fingers should be aligned with one another in a side view of the wiper blade, or the distance d should be equal in the case of both claw fingers. This enables consistent guidance and transmission of force from the wiper element to the glass.

In an embodiment of the invention, one claw finger is positioned offset in the longitudinal direction of the bow in relation to the other claw finger, or the distance d1 of one claw finger is different from the distance d2 of the other claw finger. Asymmetry of this kind in the claw can be advantageous, particularly with corresponding windshield and/or wiper blade geometries.

A further development of the invention provides for the wiper element to be curved in plan view and for the distance d1 of the claw finger on the claw sidewall which is on the outside of the curvature of the wiper element to be smaller than the distance d2 on the other side of the claw which lies on the inside of the curvature of the wiper element. A further development of the invention of this type has the particular advantage that not only is optimal conformance of the wiper element to a sharply contoured glass ensured but also that when a wiper blade curved in plan view is used, the claw is configured in such a way that the wiper element is not impeded-in its axial freedom by the claw. Wiper blades curved in plan view are used predominantly for stylistic and aesthetic reasons in motor vehicles.

According to another embodiment of the invention, the distances d1 and d2 are dependent on the degree of curvature of the wiper element when seen in plan view. With wiper elements which are only slightly curved, for example, the difference between the distances d1 and d2 is less than with especially sharply curved wiper elements. In this way optimal axial freedom of the wiper elements can be ensured even in the case of wiper elements that are curved in plan view.

One version of the invention envisions that the side of the claw base facing the wiper element with respect to the claw fingers and/or the claw fingers with respect to the claw base has or have a convex curve. Curvatures of this type make it possible to improve the axial freedom of the wiper element, particularly in the case of windshields with widely differing contours.

A further development of the invention provides for at least one claw on the claw bow to be an end claw for the wiper blade. An end claw is that claw on a wiper blade which is closest to the outer glass edge. Vehicle windshields are mostly more steeply contoured specifically in this area than in the center of the windshield. Consequently it makes sense to use claws in this particular area which ensure optimal guidance and transmission of force from the wiper element to the particularly steeply contoured sections of the windshield.

BRIEF DESCRIPTION OF THE DRAWING

In the drawing:

FIGS. 3 and 4 show two different versions of a claw for a known wiper blade in side view;

FIGS. 5, 6 and 7 show three different claws, respectively, for a wiper blade according to the invention in side view; and FIG. 8 shows the claw shown in FIG. 7 in plan view.

DETAILED DESCRIPTION

Figure 1:
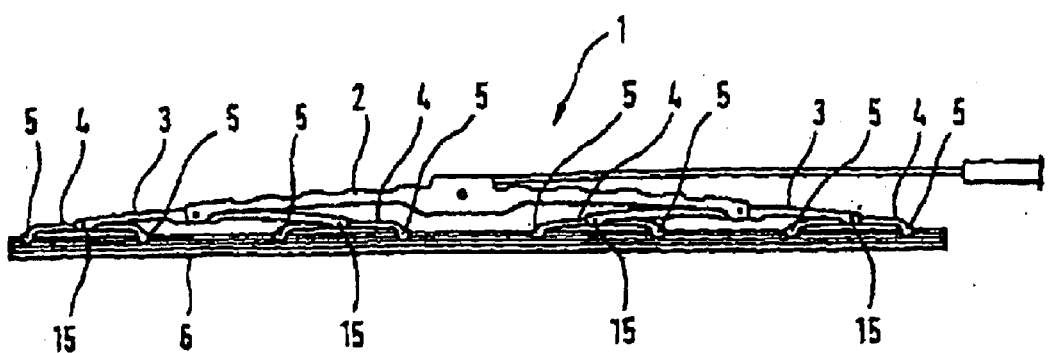
FIG. 1 shows a wiper lever arm assembly for a windshield wiper device in side view.

FIG. 1 shows as an example a wiper lever arm 1 from a known windshield wiper installation for cleaning a windshield on a vehicle with a primary bow 2, on which two bows 3 are arranged symmetrically, which in turn are connected to claw bows 4. The claw bows 4 are mounted by means of the pivots 15 so that they can articulate with respect to the bows 3. At their opposite ends, the claw bows 4 each have a claw 5 on the side facing away from the primary bow 2. The claws 5 receive the rear body 6a forming part of a rubber-like wiper element 6, which can be specifically reinforced by spring splines, which are not shown, in longitudinal grooves in the rear body 6a.

Diverging from this type of windshield wiper, the main bow 2 could be configured directly as a claw bow as part of the invention by providing a claw at each of its opposite ends.

Figure 2:
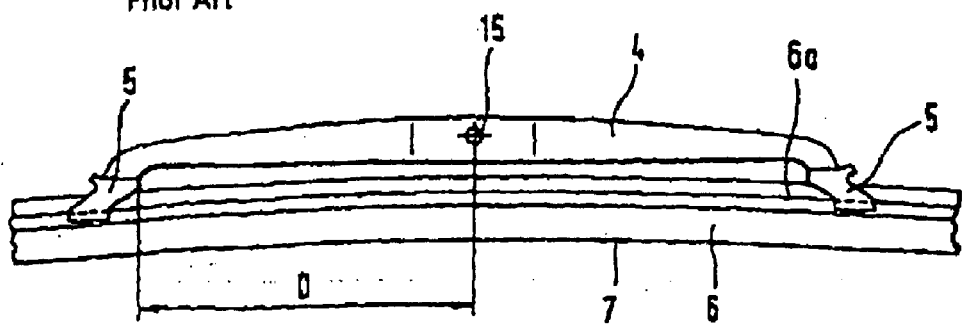
FIG. 2 shows a claw bow for a known wiper blade in side view.

FIG. 2 shows a claw bow 4 with a pivot 15 at a distance D from at least one of the claws 5, where two known claws 5 are located at the ends of the claw bow 4. These claws 5 receive the rear body 6a forming part of the wiper element 6, which has a wiping edge 7 on the side facing away from the claw bow 4.

FIG. 3 shows a section of the claw bow 4 with the pivot 15 and with a claw 5 from a known wiper blade. The claw 5 has a claw base 8, two claw sidewalk 9 positioned on the claw base 8 which guide the longitudinal sides of the wiper element 6 or rear body 6a and claw fingers 10 which partially surround the wiper element 6 or rear body 6a. The claw fingers 10 are mainly parallel to the claw base 8. Between the claw base 8 and the claw finger 10 the height x is shown of that part of the wiper element 6 or of its rear body 6a which is received by the claw 5. The wiper element 6 or rear body 6a is shown slightly curved in the side view, specifically to conform to a contoured windshield which is not shown. The claw 5 has height a between the claw base 9 and the claw finger 10. The basic rule is that the depth x of the part of the windshield wiper blade 6 to be received by the claw 5 must be less than claw depth a so that axial freedom of the wiper element 6 in the claw 5 is ensured. However it must taken into consideration that as the wiper element 6 conforms to contoured windshields not only the claw height a alone is critical for the axial freedom of the wiper element 6 but also the claw opening dimension o, which can be seen from FIG. 3, which is the sum of the distance of the tangent at the wiper element 6 at the point of contact A with the claw base 8 and the point of contact B of the wiper element 6 with the claw finger 10. According to the prior art, the rule is that the opening dimension c is always smaller than the claw height a.

To ensure optimal guidance and transmission of force by the wiper element 6 to the windshield, claw height a must not be much greater than the height x at the wiper element 6. However, the consequence of this is that the claw opening dimension c in turn is only marginally greater than the wiper element height x, which permits only a modest curvature of the wiper element in a side view, and with a greater curvature results in the wiper element 6 jamming in the claw 5. If the claw height a is selected substantially greater than the wiper element height x to allow a more pronounced curvature of the wiper element, the wiper element 6 begins to float in the claw 5. The consequence of this is poor wiping of the glass.

In FIG. 4 another claw from a known wiper blade is shown in which the problems described with FIG. 3 are mitigated by the fact that the claw finger 10 is shorter than the claw base 8. But even with a layout of this type, the potential curve in the wiper element 6 is limited by the claw height a.

Figure 5:
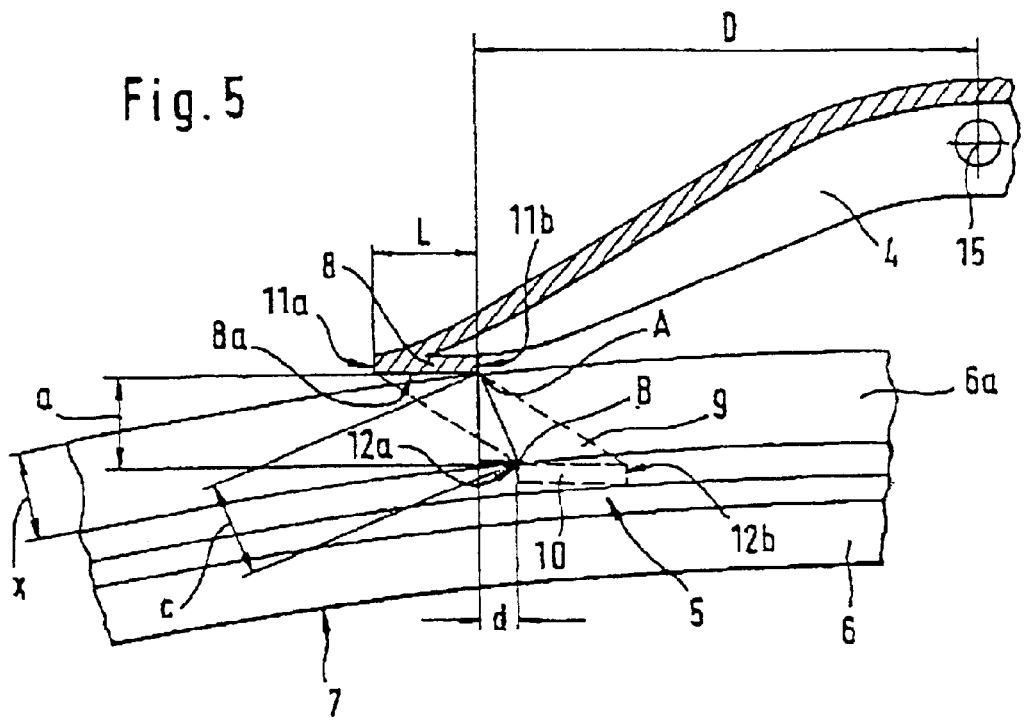

The claw shown in FIG. 5 from a wiper blade under the invention differs from the known prior art in that when projected onto the windshield the claw finger 10 is positioned closer to the pivot 15 of the claw bow 4 than the claw base 8. In this situation the distance d between the inner edge 11b of the contact surface 8a of the claw base 8 and the outer edge 12a of the claw finger is greater than or equal to zero.

Under the invention, the opening dimension c of the claw 5 between the contact point A of the wiper element 6 in a curved state at the claw base 8 and the contact point B of the wiper element 6 in a curved state at the claw finger 10 is always greater than claw height a. As can be seen from FIG. 5, the result is the right-angled triangle with the two legs a and d and the dimension c as the hypothenuse.

C is calculated as follows:

$$c=\sqrt{d^2+a^2}$$

Thus dimension c with d greater than zero is always greater than a. If the claw height a is configured even marginally greater than the height x of the part of the wiper element 6, or the rear body 6a, received by the claw 5, the wiper element 6 does not jam in the claw 5 because of the described geometries even in the case of the sharply curved wiper element 6 in the side view in FIG. 5.

Since however the height x of the wiper element 6 is always has to be less than the claw height in order to ensure axial freedom of the wiper element 6 when the wiper element 6 is not curved, it especially holds true that this axial freedom in a curved state is always given since the claw opening dimension c (hypotenuse) is always greater than or equal to claw height a (leg) when the distance d (leg) is greater than or equal to zero. Therefore, jamming of the wiper element 6 in the claw 5, particularly even with steeply contoured windshields, is no longer possible under the invention.

Figure 6:
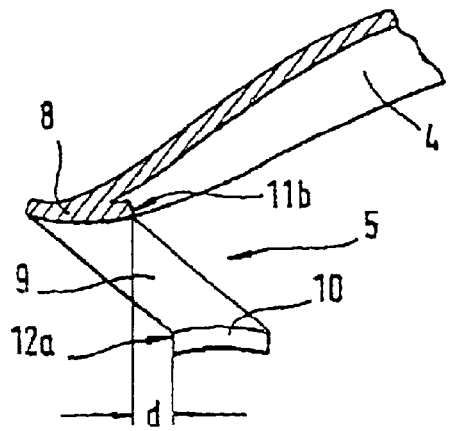

The claw shown in FIG. 6 from a wiper blade under the invention with a distance d greater than zero exhibits the special characteristic that the side of the claw base 8 facing the wiper element 6 and the side of the claw finger 10 facing the claw bow 4 have a convex curve. By means of a curvature of this type it is possible to achieve better conformance of the wiper element 6 to the claw 5, whereby better guidance and better axial freedom of the wiper element 6 in the claw 5 is ensured, which results in correspondingly good wipe performance.

FIGS. 7 and 8 show another embodiment of a claw 5 under the invention, where there is a different distance d1 or d2 respectively between the inner edge 11b of the bearing surface 8a on the claw base 8 and the outer edges 12a of the two claw fingers 13 and 14. In this case, the wiper element 6 is not only bent in side view in order to conform to a contoured windshield but also curved in plan view, as shown in FIG. 8. Wiper blades curved in this way in plan view are used primarily on vehicles for stylistic reasons, for example, to achieve a visual conformance to the adjacent curved side edge of the vehicle windshield. But even with wiper blades of this type it is necessary to guide the wiper element 6 as precisely as possible and to ensure good axial freedom.

As can be clearly seen in FIG. 8, the distance d1 from the claw finger 13 on the side of the claw which is on the outside of the curvature of the wiper element is less than the distance d2 from the claw finger 14 on the other side of the claw, which is on the inside of the curvature of the wiper element. It is precisely because of a layout of this type that the wiper element 6, which is curved in a plan view and, when required, bent in a side view exhibits good axial freedom and does not jam as the result of the positioning of the claw finger 13 and 14 in the curved and/or bent state.

Advantageously the claws shown in FIGS. 7 and 8 are also suitable when using wiper blades which are not curved in plan view and/or bent in a side view.

All the features presented in the description, the subsequent claims and the drawing can be essential to the invention, both individually as well as in any given combination.

What is claimed is:

1. A wiper blade for cleaning a windshield of a vehicle, said blade having with a frame, and with at least two claws to hold and guide a rubber-like wiper element, where the frame has at least one claw bow with a claw on at least one end of the bow and the claw bow can be connected at a distance (D) from the claw by means of a pivot to one of a wiper arm and to an additional bow on the frame, where the claw has, at the claw base, a bearing surface which presses on the upper side of the wiper element when the blade is operating, which surface is delimited in the longitudinal direction of the frame by an outer edge and an inner edge and has a maximum length (L), and where two claw sidewalls which turn into claw fingers extend from the claw base toward the windshield to be wiped running along the opposite longitudinal sides of the wiper element and where the claw fingers capture a rear body forming part of the wiper element from one of below and engage longitudinal side grooves in the rear body, where the claw fingers are bounded in the longitudinal direction of the bow and are each delimited by an outer edge and an inner edge, characterized in that the claw fingers of at least one claw on the windshield wiper are offset in the longitudinal direction in relation to the bearing surface toward the pivot of the claw bow in such a way that the outer edges of the claw feet are offset longitudinally toward the pivot of the claw bow and the claw feet underlie no more than half of the bearing surface.

2. The wiper blade in accordance with claim 1, where between the inner edge of the bearing surface and the outer edges of the claw fingers a gap d is present with d greater than zero.

3. The wiper blade in accordance with claim 1, where, in a side view of the wiper blade, the two claw fingers are aligned with each other.

4. The wiper blade in accordance with claim 1 where one claw finger is offset in the longitudinal direction in relation to the other claw finger.

5. The wiper blade in accordance with claim 4, where the wiper element is curved in plan view and where an offset distance d1 of one claw finger on the side which lies on the outside of the wiper element curvature is less than an offset distance d2 on the other claw side which lies on the inside of the wiper element curvature.

6. The wiper blade in accordance with claim 5, where the offset distances d1 and d2 are dependent on the degree of curvature of the wiper element in plan view.

7. The wiper blade in accordance with claim 1 where one of the side of the claw base facing the wiper element is curved in relation to the claw fingers and the claw fingers have a convex curve in relation to the claw base.

8. The wiper blade in accordance with claim 1, where at least one claw on the claw bow is a windshield wiper end claw.

9. The wiper blade in accordance with claim 1 where, in a side view of the wiper blade, the offset distance of the two claw fingers is the same.

10. The wiper blade in accordance with 1, where an offset distance d1 of one claw finger is different from an offset distance d2 of the other claw finger.

11. The wiper blade in accordance with claim 1, where the outer edges of the claw feet are offset longitudinally toward the pivot of the claw bow to a location equal to or greater than the inner edge of the bearing surface.

* * * * *